United States Patent [19]
Buda et al.

[11] Patent Number: 5,386,096
[45] Date of Patent: Jan. 31, 1995

[54] PROGRESSIVE CURRENT LIMIT CONTROL FOR A RESISTANCE WELDER

[75] Inventors: Paul R. Buda, Raleigh, N.C.; Mark A. Hinton, Elgin, S.C.

[73] Assignee: Square D Company, Palatine, Ill.

[21] Appl. No.: 173,835

[22] Filed: Dec. 23, 1993

[51] Int. Cl.⁶ ............................................. B23K 11/24
[52] U.S. Cl. ................................................. 219/110
[58] Field of Search ................. 219/108, 109, 110, 111

[56] References Cited

U.S. PATENT DOCUMENTS

| | | | |
|---|---|---|---|
| 3,445,621 | 5/1969 | Schomer | 219/111 |
| 3,546,421 | 7/1968 | Meyer et al. | 219/110 |
| 4,516,008 | 5/1985 | Jones | 219/109 |
| 4,945,201 | 7/1990 | Ito et al. | 219/110 |
| 5,083,003 | 1/1992 | Clark, Jr. et al. | 219/110 |

Primary Examiner—Clifford C. Shaw
Attorney, Agent, or Firm—Michael J. Femal; Richard J. Graefe; Larry I. Golden

[57] ABSTRACT

A weld controller employs a stepper program for increasing heat boost in one percent increments or steps to provide compensation for contact tip wear. The weld controller acquires weld current data in the form of current samples for each step to create a characteristic curve or nominal current profile for the stepper program. Subsequent operations of the weld control utilize high and low current limit thresholds that track the nominal current profile. The thresholds can be defined as a fixed offset from the profile or as a percentage of the profile at each step of the stepper program. This allows the use of current limits to be established in close proximity to the nominal weld current at all times, enabling the use of tighter tolerances.

23 Claims, 5 Drawing Sheets

PROGRESSIVE CURRENT LIMIT CONTROL FOR A RESISTANCE WELDER

DESCRIPTION

1. Technical Field

Applicants' invention relates generally to the field of weld controllers and more particularly to a microprocessor based weld controller system for controlling the amount of heat supplied to electrodes of the weld controller during the life of the electrodes.

2. Background Art

Many methods have been utilized to maintain a constant current density within the contact area between the weld gun contact tips and the material to be welded. As the contact tips deteriorate, the contact area increases, resulting in a decrease in the current density at the weld nugget. This results in a decreased heat input and can result in weld defects. Compensation for this decrease in current density over the life of the tips can be accomplished through several different methods to increase or boost the heat. Less heat is required during the first or early stage of the contact tips' life. Once the contact tips have settled in, during a second stage, a gradual increase in heat is required. During the last stage, as the contact tips start to deform, even more heat is required. These three stages form a user profile for the heat boost. The use of stepper programs increases the heat in equal increments according to the user profile. This profile generally will increment the heat boost in one percent steps based on a number of weld cycles. Some prior art weld controllers employ a manual stepper to adjust for the heat boost which typically is increased as a series of scheduled linear steps as specified by a weld engineer. For example, the first stage may be programmed to reach a 5 percent heat boost in one percent increments after 500 weld cycles, the second stage may be programmed to reach a 10 percent heat boost after 2000 weld cycles, and the last stage may be programmed for a 15 percent heat boost after 8000 weld cycles. Adaptive steppers vary the schedule not only as a function of the number of welds made, but also by a time rate resistance change between the contact tips. The adaptive schedule is based upon an expected normal resistance difference between consecutive weld cycles and will increase the welding current if it is less than a minimum, predetermined value. The weld controller may terminate the weld current if it is higher than expected. Commonly assigned U.S. Pat. No. 5,083,003 discloses an adaptive stepper which increases the current density and thus the heat boost as a function of not only the number of weld cycles but also as a function of expulsions. Expulsions, also known as spitting, generally indicate that too much heat is being applied during the weld cycle. Molten material is blown away from the weld zone during expulsion, resulting in a significant drop in resistance at the primary of the weld transformer supplying the contact tips.

Although the adaptive stepper is effective in adjusting the welding heat boost to compensate for deterioration of the contact tips, the weld controller is more complex, often requiring a coprocessor for the many calculations required. In addition, it becomes difficult to utilize a current limit feature that can be used to detect process variations in the welding cycle that could indicate other fault conditions. Although stepper controls increase the nominal welding current to compensate for contact tip wear, the typical approach has been to keep current limit settings fixed. This requires that the maximum current limit setting must be set higher than the normal maximum current of the controller which is attained at the end of the life of the contact tips. Likewise, the minimum current limit setting must be set below the current during the first stage when new contact tips are first being used. If meaningful process variation detection is desired in between the beginning and the end of the life of the contact tips, it becomes necessary that the current limits should follow or track the user profile programmed in the stepper control. This tracking action enables the use of current limits established in close proximity to the nominal contact tip or welding current at any point of the user profile, allowing for tighter tolerances. This could be very critical in high quality, high production resistance weld applications, as would be commonly used for automobile manufacturing applications, for instance.

SUMMARY OF THE INVENTION

Accordingly, the principal object of the present invention is to provide a weld controller having a system for generating a nominal or biasing current profile from which to control weld current for each weld cycle during the lifetime of a set of contact tips.

A further objective of the invention is to provide an apparatus for acquiring weld current data samples during welding operations, including acquisition, measurement, and conversion of the data.

Still a further objective of the invention is to provide an apparatus for using sampled data techniques to establish the nominal current profile from the data samples, the profile having a "good" weld current point for comparing the actual weld current for each weld cycle.

Yet a further objective of the invention is to provide an apparatus for calculating current limit thresholds as a function of stepper-boost or requested weld heat using the nominal current profile.

In the preferred embodiment of the invention, the invention is comprised of a system of elements including, but not limited to a stepper weld controller as is disclosed in commonly assigned U.S. Pat. No. 4,945,201. While welding, the system acquires weld current data by means of a current transformer in the primary circuit of the welder. Analog to digital converters provide the required conversion of the output current and the input voltage to signals suitable for inputting to a microprocessor based (CPU) weld controller. The CPU reduces these signals to a current sample for each one percent heat boost performed by a user programmed stepper. The user programmed stepper provides compensation for the decreased weld current density caused by the flattening of the weld contact tips through the life of the contact tips. Once acquired, this data will form a characteristic curve or nominal current profile which characterizes the stepper and the complete weld process equipment, including the weld transformer, cables, weld gun, weld contact tips, and so on, in use.

Following subsequent operations, thresholds for the current limit operations are defined as values relative to the nominal current profile, rather than as a fixed limit as in the prior art. The thresholds can be defined as an offset from the profile or as a proportional value of the profile. The calculation of the limit threshold relative to the nominal current profile may readily expanded to include other forms of relative values. The object of the invention is not restricted to a particular relative value calculation. The thresholds are therefore values relative to the nominal current profile which represents the actual measured weld current at each step of the stepper current density compensation.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
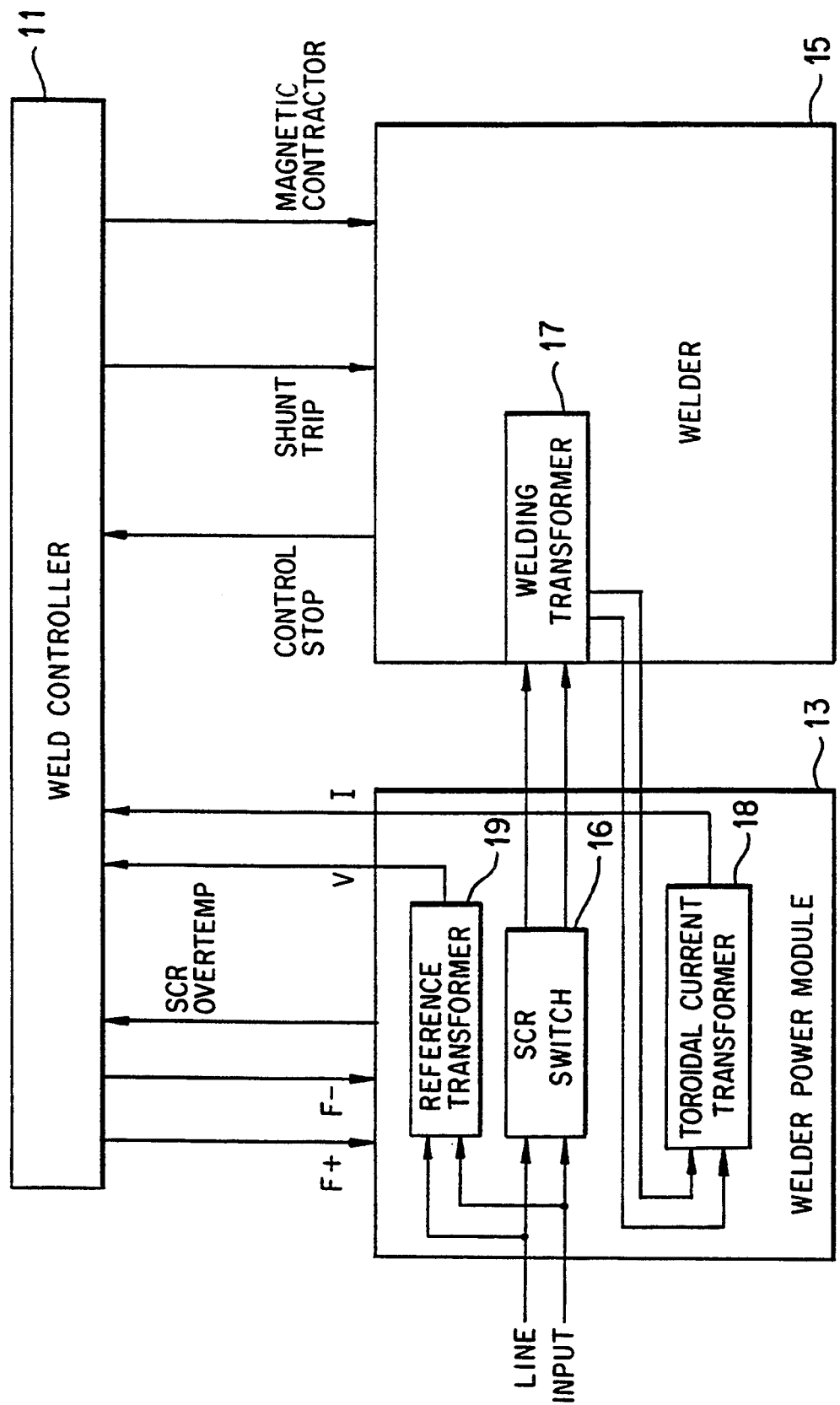
FIG. 1 is a block overview diagram showing a welder and weld controller system.

FIG. 1 illustrates a typical welder system 10 consisting of a weld controller 11, welder power module 13, and welder 15. Weld controller 11 generates firing signals F+ and F− used to energize or turn on SCR switch 16 which is coupled to welding transformer 17 to supply power to contact tips and the workpiece being welded. The primary current of welding transformer 17 is monitored by using a toroidal current transformer 18 coupled to its primary circuit. A reference transformer 19 monitors the incoming line input voltage. In addition to voltage V and current 1 signals, weld controller 11 receives an over-temperature signal from the SCR switch 16 for use in control algorithms within the weld controller 11 as a protective feature to control or shutdown the welder 10 if the SCR switch reaches a predetermined temperature. Specific implementation details of welder system 10 may be found in U.S. Pat. No. 4,945,201, although such details are not necessarily required for a correct understanding of the present invention.

Figure 2:
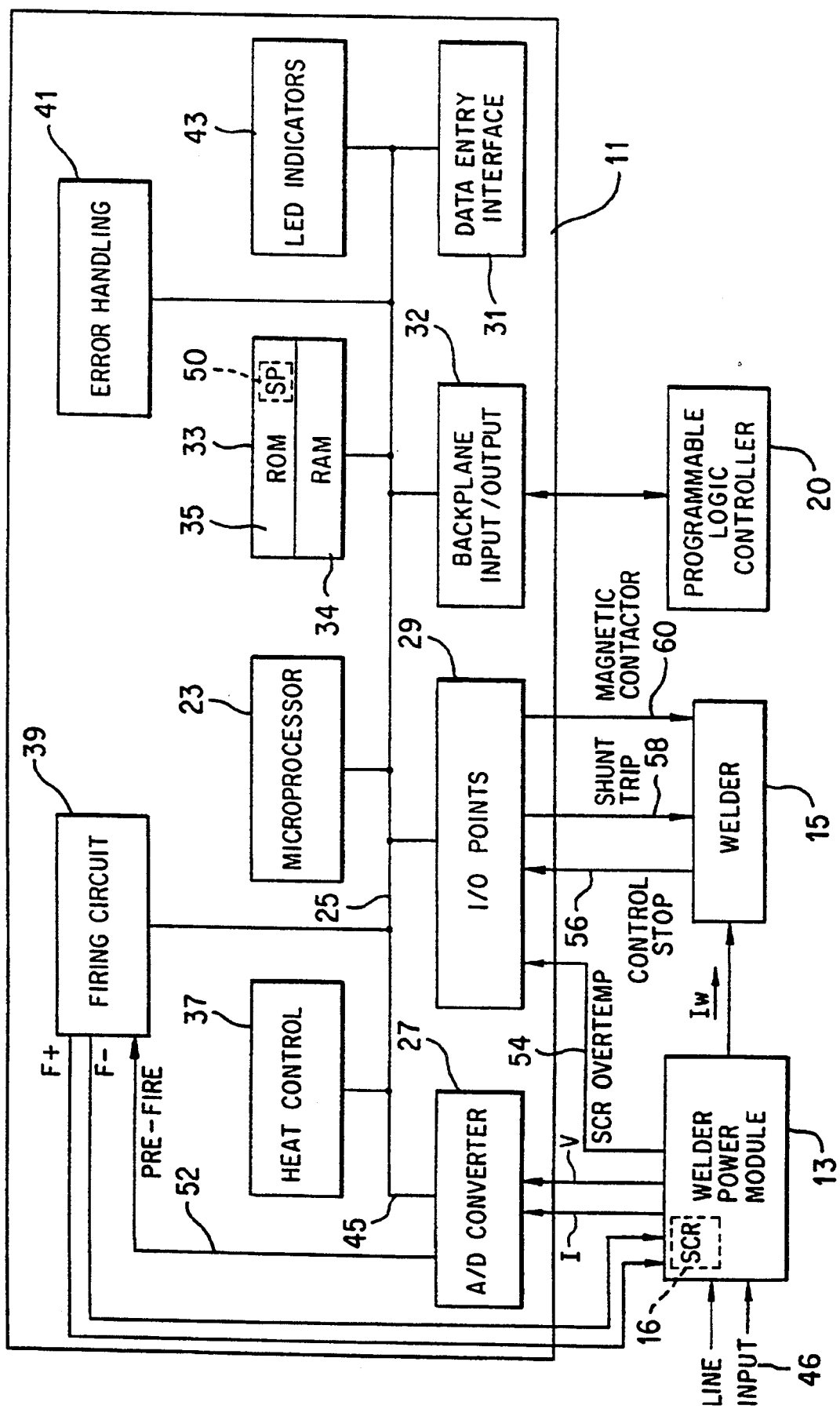
FIG. 2 is a detailed block diagram showing a welder and weld controller system implementing a progressive current limit control according to the present diagram.

Referring to FIG. 2, a block diagram details a welder 15 and weld controller 11 implementing a progressive current limit control according to the present invention. The weld controller 11 may be part of a larger system controlled by programmable logic controller (PLC) 20 or it may be self-contained. A backplane interface 22 provides a means of coupling the PLC 20 to microprocessor (CPU) 23 to a data bus 25. CPU 23 is also coupled via data bus 25 to A/D converter 27, input/output interface 29, data entry interface 31, memory 33 comprising both RAM 34 and ROM 35, firing circuit 39, and LED indicators 43. LED indicators 43 provide status information of the weld controller 11. Control and timing signals required for operation of the CPU 23 are not shown as they are well known to those skilled in the art and not an object of the present invention. A program stored in ROM 35, similar to a program as disclosed in U.S. Pat. No. 4,516,008 provides control of the power module 13 and welder 15 and the welding process by operation of CPU 23. This program will generate SCR firing signals F+ and F− through firing circuit 39 to control the weld sequence in response to various input signals. The present invention improves the referenced program and other types of welder controls by adding a method of limiting weld current Iw during the life of contact tips within the welder 15, as will be described below.

A two channel A/D converter 27 converts analog signals I and V from welder power module into digitalized signals 45 which represent welding transformer 17 primary weld current Iw and power line input voltage 46, respectively. The digitalized signals 45 are placed on bus 25 for storage in RAM 34 and for use as feedback control signals in execution of a weld control program 50 resident in ROM 35. The A/D converter 27 also generates a prefire signal 52 for input to firing circuit 39. An enable signal is also generated by control program 50 to prevent erroneous firing due to a possible program "hang-up" since two actions, prefire and enable, are required before the firing signals F+, F− are generated. Details regarding the firing circuit 39 and A/D converter 27 are well known and will therefore not be described further.

The input/output interface 29 receives an input 54 from welder power module 13 if the temperature of the SCR switches 16 reaches a predetermined set point, indicative of an overtemperature condition. The temperature is monitored every weld cycle and if it reaches the set point, input 54 will cause the control program 50 to disable the weld current Iw and put an error message in error handling 41 which is actually a portion of the weld control program 50 in ROM 35. Control stop signal 56 is a signal generated within welder 15 as an interlock control and will be activated if an operator or an external device causes the interlock to open. Again, this signal 56 will cause the control program 50 to disable the weld current Iw and put an error message in the error handling 41. The external device is normally a palm button that is depressed to indicate an emergency condition that requires an immediate cancellation of the welding cycle. Since a shorted SCR switch 16 would result in continuous current to the welder 15, a shunt trip circuit breaker is placed in series within welder 15 to remove power if a shorted SCR condition occurs. This condition is assumed to exist if current I is sensed at a time when it has not been commanded by the welder control 11. The welder control 11 will generate a shunt trip signal 58 to cause the circuit breaker to trip out under the shorted SCR condition. An additional output 60 controls a magnetic contactor for use within the welder 15 and is energized when a welding sequence begins.

Heat control 37 is also a portion of the weld control program 50 in ROM 35. Its primary function is to maintain a constant current density within the contact area between the weld gun contact tips and the material to be welded, as the contact tips mushroom through continued use. Current density determines the amount of heat generated within the weld zone. To control heat to the weld zone, heat control 37 determines and controls the firing angle of the firing pulses F+ and F− and the phase relationship between the I and V signals. Although several different methods exist for compensating for wear of the contact tips, in the preferred embodiment, a stepper program is employed which will increase or boost the heat in equal increments according to a user profile as specified by the nominal characteristic curve. This profile generally will increment the heat boost in one percent steps based on a number of weld cycles and is entered through the data entry interface 31 by a weld engineer.

Figure 3A:
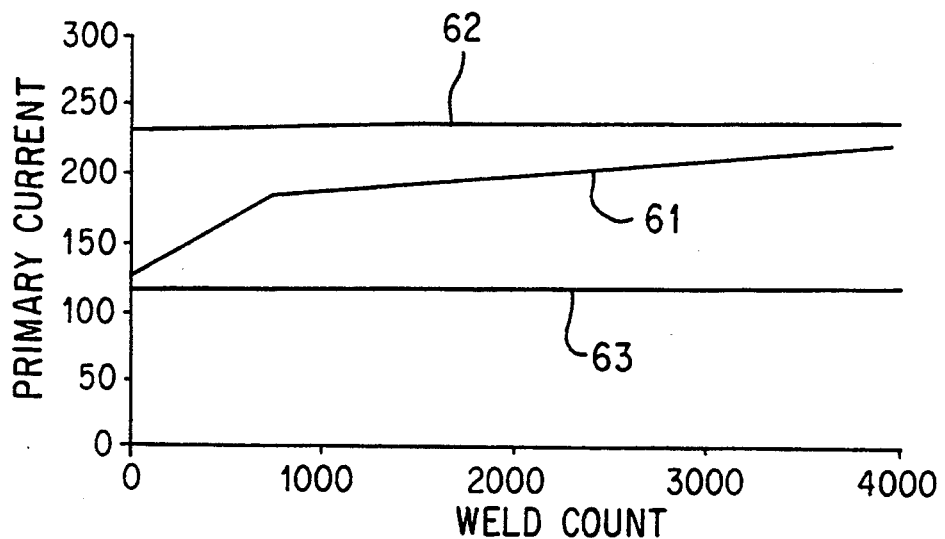
FIGS. 3a-c are graphical representations of fixed, offset, and proportional current limit schemes illustrating the relationship between the number of welds and the minimum and maximum limits of the primary current of a welder transformer.
Figure 3B:
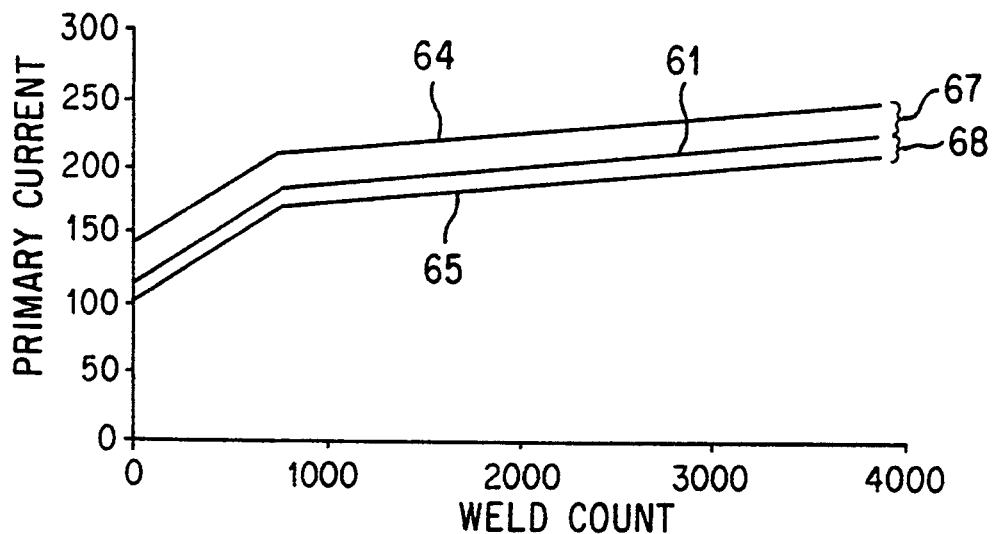
Figure 3C:
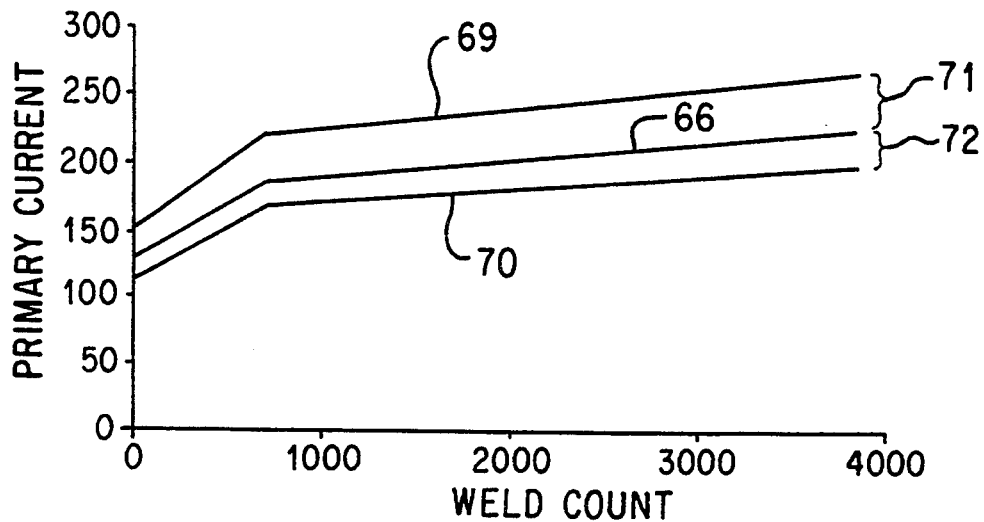

Fixed current limits require that the maximum current limit setting be set higher than the normal maximum current of the controller which is attained at the end of the life of the contact tips and the minimum current limit setting be set below the current during the first stage when new contact tips are first being used. This is shown in FIG. 3a. Stepper current profile 61 programmed in the stepper control is bounded by an upper current limit 62 and a lower current limit 63. Limits 62 and 63 are absolute and are user programmed. They are invariant with respect to any other welding parameters or conditions. The present invention improves on this method by establishing tracking limits which become a function of the nominal welding current or heat. FIG. 3b illustrates one version of the present invention using a constant offset limit from a nominal current. Upper current limit 64 and lower current limit 65 follow or track a nominal current as specified by a nominal current characteristic curve 66. The characteristic curve 66 is defined through empirical current data acquired for each one percent boost point of the stepper sequence obtained during an initial or a series of stepper operations and then using the resultant current profile for subsequent operations. Once acquired, the characteristic curve or nominal current profile characterizes the stepper and the complete weld process equipment, including the weld transformer, cables, weld gun, and weld contact tips in use. The offset 67 between the upper limit 64 and the nominal current 66, and the offset 68 between the lower limit 65 and the nominal current 66 is fixed. This offset is entered through the data entry interface 31 by a weld engineer. In another version of the present invention, as shown in FIG. 3c, the upper 69 and lower 70 current limits follow or track the characteristic curve 66, obtained as with the fixed offset method, by a fixed percentage of the nominal characteristic curve 66. This percentage is also entered through the data entry interface 31. Both the offset limit and the proportional limit procedures enable the use of current limits established in close proximity to the nominal welding current at the different weld counts.

Figure 4:
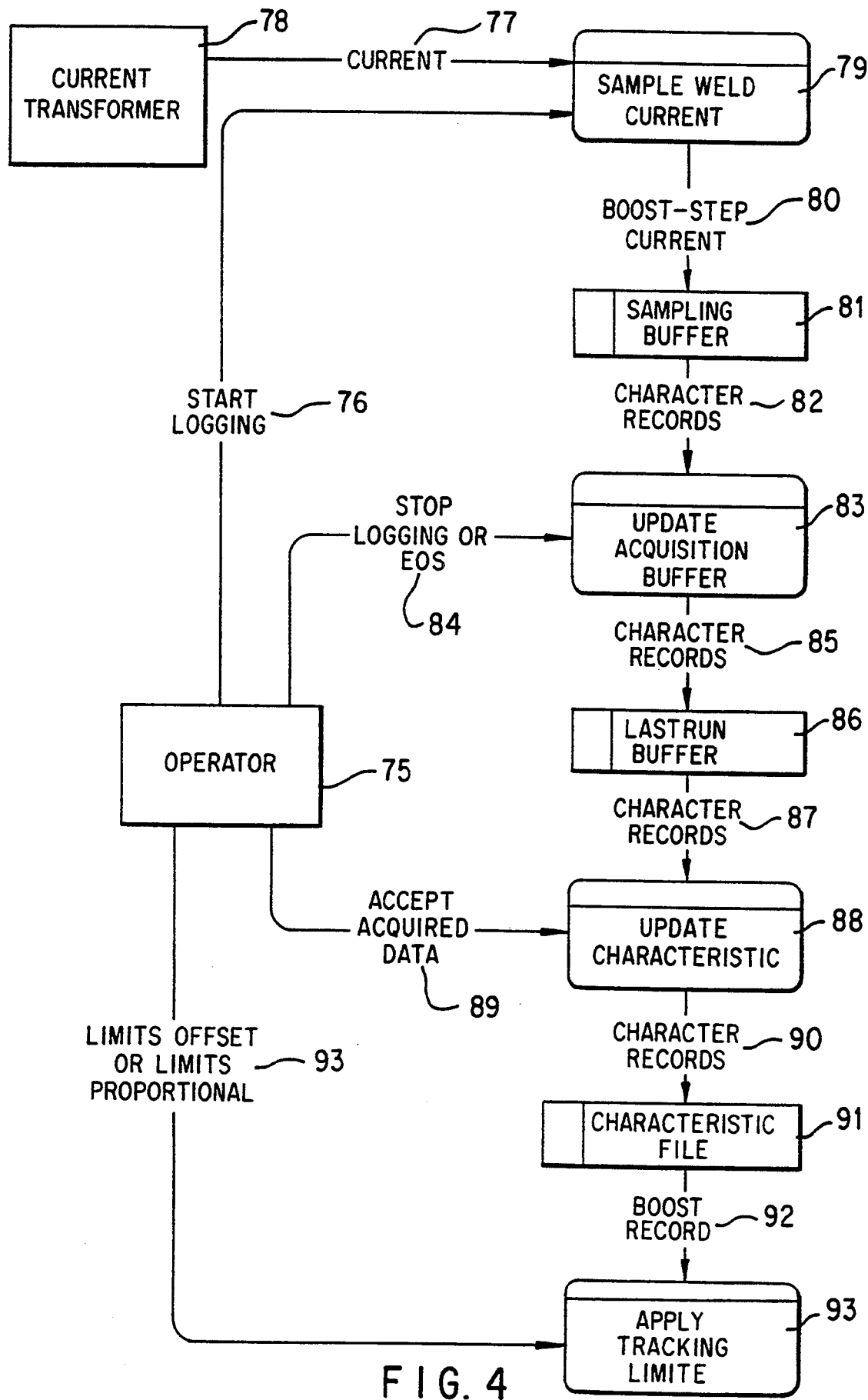
FIG. 4 is a simplified dataflow diagram showing a system for generating and utilizing a characteristic current profile for use with the weld controller system implementing the progressive current limit control according to the present invention.

The dataflow diagram shown in FIG. 4 provides an overview of the operation of the preferred embodiment of the present invention for implementing the progressive current limit control for utilizing a characteristic current profile for use with the weld controller system 11. An operator 75 can select a sampling mode and a logging mode for a data acquisition run for a particular, selected weld schedule. Various current sampling modes are possible. An average mode will provide the average of all weld current samples in a boost step as representative of the nominal current for that step. A five sample minimum mode will compute and log the average of the five lowest current welds within the boost step. Other alternatives are possible since the invention is not restricted by a particular sampling and filtering mode. The logging mode allows the enabling or disabling of the logging of weld current data and has two options for polypulse welding logging strategy. Polypulse welding uses multiple pulses in one welding sequence and the weld current data can be selected to accumulate only the first weld pulse of each weld sequence or the average of all weld pulses of each weld sequence. Once an operator 75 has selected sampling and logging modes and enabled or started 76 the logging of weld data through the data entry interface 31, weld current 77 as measured by a current transformer 78 located in the welder power module 13 is sampled 79. These samples are accumulated to form a single sample for each heat boost increment, according to the sampling and logging modes selected. Each heat boost increment current value 80 is written to a sampling buffer 81 at the next boost point of the stepper. The sampling buffer 81 will contain the current profile being constructed for the selected weld schedule while the current data is still being acquired. Update acquisition buffer 83, which is triggered by receipt of Stop Logging or End of Stepper command 84 reads characteristic records 82 from sampling buffer 81 and writes characteristic records 85 to last run buffer 86. Buffer 86 will always contain the most recently acquired set of nominal current profile data for a particular weld schedule. This data may be examined and modified by the operator 75 through the data entry interface 31. When logging is started, the sampling buffer 81 is reinitialized before any data is acquired. The last run buffer 86 is not initialized, and its data can be viewed or edited. If EOS 84 is encountered, the last run buffer 86 will be overwritten from the sampling buffer. During the data acquisition and logging operation for the selected weld schedule, the schedule is back filled from the lowest recorded boost point to the zero boost point with the current recorded at the lowest observed boost point. On termination of the data acquisition and logging operation for the selected weld schedule, the schedule is forward extrapolated from the highest recorded boost point and the midpoint of observed boosts to supply current records beyond the range of observed boosts. Data in the last run buffer 86 can only be transferred to a characteristic file 91 through action 89 by operator 75. This action is performed when the acquired data is ready. There will be an unique profile 61 for each different weld schedule. Operator 75 can view and update the characteristic file 91 to fine tune the current profile. This is also accomplished through the data entry interface 31 before accepting the nominal current profile generated by the data acquisition procedure.

Once a characteristic file 91 exists for a particular weld schedule, the operator 75 can select 93 the type of current limits desired and apply them to a tracking limit 95 for the weld schedule. Selecting ABSOLUTE LIMITS disables tracking current limits and activates standard and constant minimum and maximum current thresholds of the prior art. Selecting OFFSET LIMITS enables the fixed offset limit mode of operation. The operator enters a minimum and maximum offset from the nominal current value for each boost step. As an example, entering 10 for the minimum and 20 for the maximum sets the minimum current limit 10 A below the nominal current value and the maximum current limit 20 A above the nominal current value for each boost step. Selecting PROPORTIONAL LIMITS enables the proportional limit mode of operation. The operator enters a minimum and maximum percentage of the recorded nominal current for each boost step. For example, entering 90 for the minimum and 120 for the maximum sets the minimum current limit at 90 percent of the nominal current value and the maximum current limit at 120 percent of the nominal current value for each boost step. Once the current limit mode is selected, the characteristic file is ready for use as a tracking current limit control during normal operation of the welder control 11. During normal operation, if the weld current is outside the selected current limits, the weld controller will declare an event occurrence. An event is an internal indication that a logical condition has been satisfied. The result of the event occurrence is dependant on the particular condition and could result in changing outputs, energizing light indicators, sending warning signals to other devices, or even terminating the weld process itself.

Figure 5:
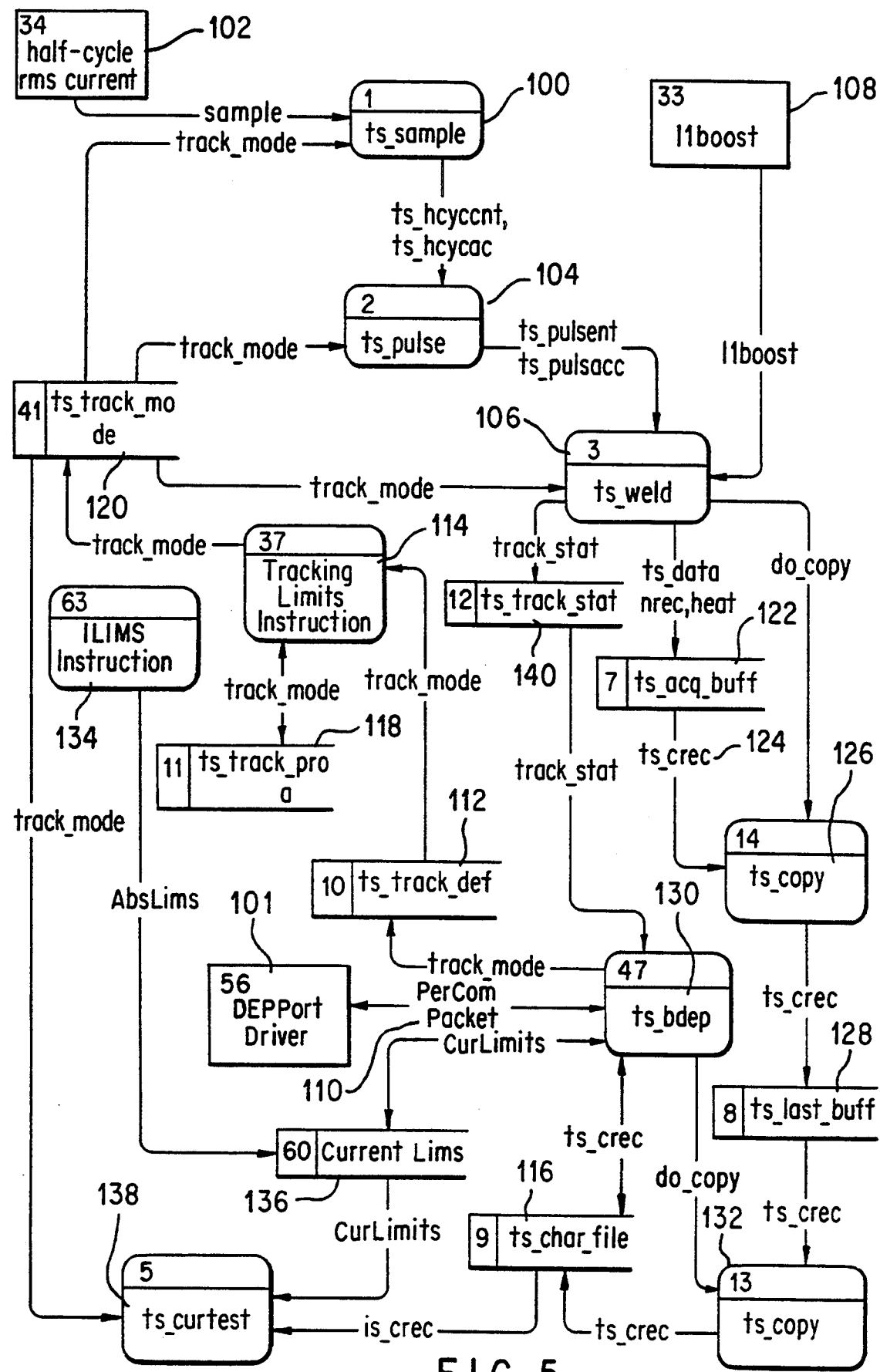
FIG. 5 is a detailed dataflow diagram showing a system for generating and utilizing a characteristic current profile for use with the weld controller system implementing the progressive current limit control according to the present invention.

FIG. 5 is a detailed dataflow diagram of the system described in FIG. 4. After the operator 75 selects the sampling mode and logging mode for a data acquisition run for a particular, selected weld schedule, current sampling 100 will begin. This is accomplished through the data entry interface 31 which is coupled to port driver 101 for providing data that defines the sampling mode, the pulse mode and the type of current limit control: absolute, fixed offset, or proportional. The system will calculate 102 the positive and negative half cycle RMS weld current sample using a method as disclosed in commonly assigned U.S. Pat. No. 4,516.008. Output signals ts_hcycac, consisting of accumulated half cycle current samples, and ts_hcyccnt, the number of current samples is processed 104 once per weld pulse to generate accumulated weld-pulses ts_pulsacc, and the number of pulses accumulated ts_pulscnt. These accumulated weld-pulses will be further processed 106 to form a single sample for each stepper heat boost interval as identified from external input I1boost 108. APerCom Packet 110 as received from port 101 from the operator 75 contains programming information for selecting and modifying various parameters within the system. Track_mode of the system incorporates the limit mode selected, absolute, offset, or proportional, and the limit thresholds selected for each mode. The limit mode and the limit thresholds may be selected by the operator 75 through data entry interface 31 and support routine 130 or through a weld schedule instruction. Register 112 contains operator entered default values and programmed changes are stored in register 118. Tracking limit routine 114 will copy the default value from register 112 to track mode register 120 prior to weld schedule execution. Programmed changes are made to register 120 as they are encountered. At the conclusion of the weld schedule, the default mode and thresholds stored in register 112 will be copied into register 120. When the present boost interval is completed, the boost sample will be transferred to acquisition sample buffer 122. This buffer 122 will be a file of records in which current samples are stored for each boost interval. Acquisition buffer 122 is updated until the logging operation is terminated as a result of a manual operation by the operator 75 or if the acquisition run is completed. A characteristic record 124 is created from the acquisition buffer 122 and it can be viewed and edited for fine tuning. When the operator 75 accepts the characteristic record 124 created from the acquisition buffer 122, it is automatically transferred 126 to the last run buffer 128 on termination of logging. Buffer 128 will always contain the most recently acquired set of nominal current profile data for a particular weld schedule. This data may still be examined and modified with support routine 130 by the operator 75 through port 101. Data in the last run buffer 128 is transferred 132 to characteristic file 116 through action of the operator 75 when the acquired data is accepted and ready to be used for nominal current profiles 61 previously described. Operator 75 can still view and update the characteristic file 116 to fine tune the current profile before accepting the nominal current profile generated by the data acquisition procedure. Once a characteristic file 116 exists for a particular weld schedule, the operator 75 selects and stores the type of current limit threshold desired. The limit mode and the thresholds may be selected by the operator 75 via operator interface instructions through the support routines 130, or via a weld schedule instruction ILIMS 134 or Tracking Limits Instruction 114. ILIMS 134 will select absolute limits and set the thresholds. Tracking Limits Instruction 114, if used will select the specified mode, either offset or proportional, and set the thresholds for that mode. The scope of these instructions is limited to the execution of the weld schedule in which they occur. On completion of the selected weld schedule, the mode and thresholds will revert to their values held prior to execution of that schedule.

Once a particular characteristic current profile and tracking mode has been established, the welder control will function with the progressive current limits active. This procedure can be used over to create different characteristic current profiles and tracking modes for different weld stepper programs. Actual undercurrent and overcurrent limit checks will be performed by routine 138 according to the active current limit mode selected.

While the specific embodiments have been illustrated and described, numerous modifications are possible without departing from the scope or spirit of the invention. Although the progressive current limit control is described for use with a welder using a stepper control, the system could be adaptable for use with any type of system requiring current limit control following a progressive increase or decrease in operating current. Additionally, implementation of the weld controller might utilize a secondary computer, which might be a personal computer.

We claim:

1. A weld controller system for controlling the operation of a welder including a weld transformer and at least one pair of contact tips that apply current to create weld heat between at least two workpieces, said weld controller having a plurality of welding cycles, said weld controller system comprising:

A. a microprocessor;
   B. welder power means controlled by a program operating in said microprocessor and operatively connected to said weld transformer for supplying weld current to said contact tips to create said weld heat in said workpieces, said program for increasing said weld heat in increments following a predetermined stepper program having a plurality of weld cycles to provide compensation for deterioration of said contact tips wear;

C. a current sensor for sensing current supplied by said welder power means to said weld transformer, said current sensor for providing weld current data for use by said program;

D. a current limit control having an upper current threshold and a lower current threshold, said current limit for comparing said sensed weld current data with a current profile at each of said plurality of weld cycles, said current limit control for indicating an event condition if said sensed weld current data exceeds said upper current threshold or is below said lower current threshold; and E wherein said upper current threshold and said lower current threshold track said current profile by a predetermined current offset at each of said plurality of weld cycles.

2. The weld controller system of claim 1 wherein said stepper program increases said weld heat in a plurality of steps following a predetermined weld schedule to generate said predetermined current profile, said stepper program for increasing said weld current in each of said plurality of steps by a predetermined heat boost increment after a predetermined number of weld cycles.

3. The weld controller system of claim 2 wherein said predetermined increment in each of said plurality of steps is equivalent to a one percent increase in heat boost in said heat applied in said workpieces.

4. The weld controller system of claim 3 wherein said stepper program includes a plurality of stages of weld cycles, including at least an initial stage wherein said heat boost increases to a first predetermined percentage after a predetermined number of said weld cycles and a second stage which follows said initial stage wherein said heat boost increases to a second predetermined percentage greater than said first predetermined percentage after a second predetermined number of said weld cycles.

5. The weld controller system of claim 2 wherein said current profile is generated from an acquisition run of said weld controller using said stepper program to acquire multiple current data samples at each step of said stepper program, said acquisition run further including means for filtering said multiple current data samples at each step to obtain a nominal weld current value at each step.

6. The weld controller system of claim 5 wherein said current sensor includes a current transformer coupled to a primary circuit of said weld transformer and an analog to digital converter to produce said current data samples and said microprocessor converts said current data samples to digital representations of the RMS value of the weld current.

7. The weld controller system of claim 5 wherein said current profile further includes means to modify said nominal weld current value at each step of said stepper program.

8. The weld controller system of claim 5 wherein said current profile further includes means to associate said upper current threshold and said lower current threshold with said predetermined current offset with said nominal weld current value at each step of said stepper program.

9. The weld controller system of claim 2 wherein said predetermined current offset between said current profile and said upper current threshold is a selectable value, said value constant for each step of said stepper program, and wherein said predetermined current offset between said current profile and said lower current threshold is a separately selectable value, said value constant for each step of said stepper program.

10. The weld controller system of claim 2 wherein said predetermined current offset between said current profile and said upper current threshold is a selectable and fixed percentage value of said current profile for each step of said stepper program, and wherein said predetermined current offset between said current profile and said lower current threshold is a separately selectable and fixed percentage value of said current profile for each step of said stepper program.

11. A weld controller system for controlling the operation of a welder including a weld transformer and at least one pair of contact tips that apply weld current to create weld heat between at least two workpieces, said weld controller having a plurality of welding cycles, said weld controller including a current limit control for limiting said weld current between an upper and a lower current threshold, said system comprising:

A. a microprocessor;

B. a program operating in said microprocessor, said program for increasing said weld heat in increments following a predetermined stepper program having a plurality of weld cycles;

C. a current sensor for sensing current applied to said weld transformer, said current sensor for providing weld current data for use by said program;

D. a comparison means for comparing said sensed weld current data with a predetermined current profile at each of said plurality of weld cycles, and for indicating an event condition if said sensed weld current data exceeds said upper current threshold or is below said lower current threshold; and E wherein said upper current threshold and said lower current threshold track said current profile by a predetermined current offset at each of said plurality of weld cycles.

12. The weld controller system of claim 11 wherein said program includes a user programmed stepper for increasing said weld heat in a plurality of steps following a predetermined weld schedule, said stepper for increasing said weld heat in each of said plurality of steps by a predetermined increment after a predetermined number of said weld cycles, said increment equivalent to a predetermined percentage of heat boost of said heat between said workpieces.

13. The weld controller system of claim 12 wherein said predetermined percentage of heat boost is a one percent increase in heat boost.

14. The weld controller system of claim 12 wherein said predetermined stepper program includes a plurality of stages of weld cycles, including at least an initial stage wherein said heat boost increases to a first predetermined percentage after a predetermined number of said weld cycles and a second stage which follows said initial stage wherein said heat boost increases to a second predetermined percentage greater than said first predetermined percentage after a second predetermined number of said weld cycles.

15. The weld controller system of claim 12 wherein said predetermined current profile is generated from an acquisition run of said weld controller using said stepper program to acquire multiple current data samples at each step of said stepper program, said acquisition run further including means for filtering said multiple current data samples at each step to obtain a nominal weld current value at each step on said predetermined current profile.

16. The weld controller system of claim 15 wherein said current sensor includes a current transformer coupled to a primary circuit of said weld transformer and an analog to digital converter to produce said current data samples and said microprocessor converts said current data samples to digital representations of the RMS value of the weld current.

17. The weld controller system of claim 16 wherein said predetermined current offset between said current profile and said upper current threshold is a selectable value constant for each step of said stepper program and wherein said predetermined current offset between said current profile and said lower current threshold is a separately selectable value, said value constant for each step of said stepper program.

18. The weld controller system of claim 16 wherein said predetermined current offset between said current profile and said upper current threshold is a selectable and fixed percentage value of said current profile for each step of said stepper program, and wherein said predetermined current offset between said current profile and said lower current threshold is a separately selectable and fixed percentage value of said current profile for each step of said stepper program.

19. The weld controller system of claim 15 further including means to modify said nominal weld current value of said predetermined current profile at each step of said stepper program.

20. A progressive current limit control system for use with a resistance welder, said system comprising:
  A. a microprocessor;
  B. a stepper program operating in said microprocessor, said program for increasing weld heat in increments following said stepper program and said stepper program having a plurality of weld cycles;
  C. a current sensor for sensing a weld current of said welder, said current sensor for providing weld current data;
  D. a current profile;
  E. a comparison means for comparing said sensed weld current data with an upper current threshold and a lower current threshold relative to said current profile at each of said plurality of weld cycles, and for indicating an event condition if said sensed weld current data exceeds said upper current threshold or is below said lower current threshold; and
  F. wherein said upper current threshold and said lower current threshold track said current profile by a predetermined current offset at each of said plurality of weld cycles.

21. The progressive current limit control system of claim 20 wherein said current profile is generated from an acquisition run of said resistance welder using said stepper program to acquire multiple current data samples at each step of said stepper program, said acquisition run further including means for filtering said multiple current data samples at each step to obtain a nominal weld current value at each step on said current profile.

22. The progressive current limit control system of claim 21 wherein said predetermined current offset between said current profile and said upper current threshold is a selectable value constant for each step of said stepper program and wherein said predetermined current offset between said current profile and said lower current threshold is a separately selectable value, said value constant for each step of said stepper program.

23. The weld controller system of claim 21 wherein said predetermined current offset between said current profile and said upper current threshold is a selectable and fixed percentage value of said current profile for each step of said stepper program, and wherein said predetermined current offset between said current profile and said lower current threshold is a separately selectable and fixed percentage value of said current profile for each step of said stepper program.

* * * * *